Nov. 22, 1955     C. CAREY ET AL     2,724,602

FLUID TIGHT CONNECTION

Filed Dec. 1, 1950

INVENTORS
COLWELL CAREY.
ANGELO DE FEO.

BY *Victor D. Behn*

ATTORNEY

United States Patent Office 2,724,602
Patented Nov. 22, 1955

2,724,602

FLUID TIGHT CONNECTION

Colwell Carey, Fair Lawn, and Angelo De Feo, Paterson, N. J., assignors to Curtiss-Wright Corporation, a corporation of Delaware Application December 1, 1950, Serial No. 198,676

3 Claims. (Cl. 285—90)

This invention relates to fluid tight joints between tubular members and is particularly directed to a fluid tight joint between a pair of tubular members in which a seal is provided by a ring of rubber-like material disposed in compression between said tubular members.

The invention has been designed for use in connection with oil and fuel pressure lines of aircraft engines. As will appear however the invention is of general application. In the case of fuel or oil lines of an aircraft engine, the use of a ring of rubber-like material in radial compression between a pair of tubular members for providing a seal therebetween is quite common for example, see Patent No. 2,521,127. From the standpoint of life and seal effectiveness of the rubber-like ring, it has been found that the tubular members preferably should be rigidly secured together to prevent relative motion between either of said members and the rubber-like ring. If however a fuel or oil line of an aircraft engine is rigidly clamped to its tubular engine-supported terminal fitting the engine vibration and/or the variations in pressure within the line may be sufficient to cause the line to break. On the other hand if, as in said prior patent, in order to avoid excessive vibration stresses in the fuel and/or oil lines, said lines are supported in their terminal fittings so as to be free to move relative thereto except for the restraint provided by the compression of their rubber-like seal rings, then the relative motion between said lines and their terminal fittings may become so large as to cause the rubber-like seal rings to scuff whereupon said rings soon lose their seal effectiveness.

An object of the present invention comprises the provision of a fluid tight joint between a pair of tubular members in which the seal is provided by a rubber-like ring disposed in compression between said members and additional means are provided for elastically restraining relative motion between said tubular members. In accordance with the present invention a fluid tight joint between a pair of tubular members comprises a ring of rubber-like material disposed in radial compression between said members to provide a seal therebetween and other rubber-like means is squeezed between said members to restrain said members against relative motion.

Other objects of the invention will become apparent upon reading the annexed detailed description in connection with the drawing in which.

Figure 3:
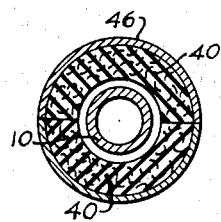
Figure 1:
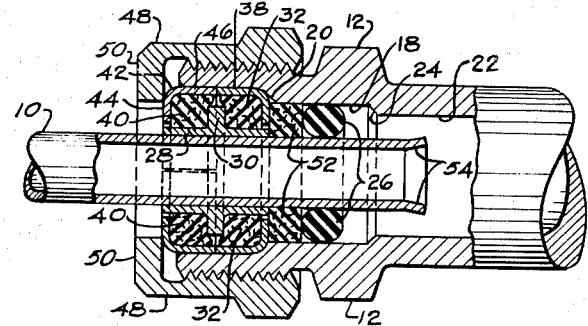
Figure 1 is an axial sectional view through a fluid tight joint embodying the invention.
Figure 4:
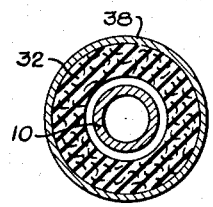
Figure 2:
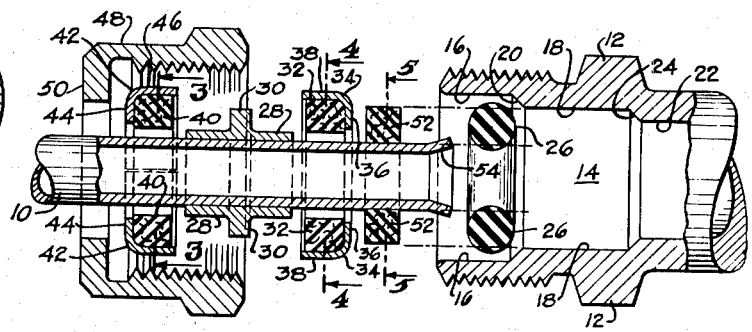
Figure 2 is an exploded sectional view of the parts illustrated in Figure 1.
Figure 5:
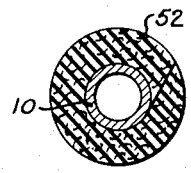
Figure 6:
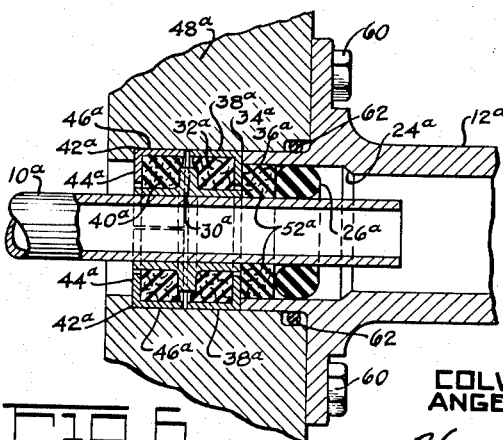

Figures 3, 4 and 5 are sectional views taken along lines 3—3, 4—4 and 5—5 of Figure 3; and Figure 6 is a view similar to Figure 1 but illustrating a modified construction.

Referring to the drawing, a relatively thin walled tube 10 is provided for conveying a fluid, such as fuel or oil, to or from a body member 12. The body member may be supported on an aircraft engine (not shown) utilizing said fuel or oil. In order to provide a fluid tight joint between the tube 10 and member 12, said member is provided with a cylindrical bore or chamber 14 having an open end into which the tube 10 extends. As illustrated, the chamber or bore 14 comprises a relatively large diameter portion 16 adjacent said open end and a relatively small diameter portion 18 disposed axially inwardly of said large diameter portion thereby forming an annular shoulder 20 facing said open end. In addition the bore or chamber 14 may have a still smaller diameter portion 22 disposed co-axially inwardly of the portion 18 thereby forming a second annular shoulder 24 facing the open end of said bore.

The tube 10 is adapted to be inserted into the bore 14 within the body member 12 at least part way into the portion 18 and preferably, as illustrated, into the smaller bore portion 22. A packing or seal ring 26 of rubber-like material is adapted to be disposed in radial compression in the annular space between the tube 10 and the adjacent wall of the chamber portion 18 thereby providing a seal between the tube 10 and the member 12. As best seen in Figure 3, the ring 26 in its free condition, has a circular cross action and has a free internal diameter which is slightly smaller than the diameter of the tube 10 and has a free external diameter which is slightly larger than the internal diameter of the chamber portion 18 to be engaged by said ring. As used in the specification and claims, by "free condition" and "free diameter" of the packing ring 26 is meant the condition and diameter, respectively, of said ring when no external forces other than gravity are applied thereto. With the packing ring 26 and the annular space in which said ring is to be disposed having these relative dimensions, said ring is placed in radial compression when disposed in said annular space.

The ring 26 provides the seal between the tube 10 and the body member 12. It is also necessary to prevent axial separation of said tube and body member. If the tube 10 and body member 12 are rigidly connected together and said tube is also rigidly supported at its other end then vibrations of the engine supported body member 12 and/or variations in the fluid pressure within the tube 10 may cause said tube to break. In accordance with the present invention, the tube 10 and body member 12 are connected together by means including elastically yieldable means which permit some relative motion between said tube and body member but prevent or damp excessive motion therebetween such as might cause the packing ring 26 to scuff. Obviously any scuffing of the packing ring 26 causes said ring to lose its seal effectiveness.

In order to connect the tube 10 to the body member 12, an annular ferrule 28 of T-shaped cross section is secured, as by brazing, to and about the tube 10 at a point disposed adjacent to but spaced from the end of said tube inserted within the chamber 14 of the body member 12. Thus the ferrule 28 provides a radially-outwardly-extending flange or collar 30 about and rigid with the tube 10. The maximum diameter of the flange 30 is less than the diameter of the chamber portion 16 within which said flange is disposed.

An annular ring 32 of elastically yieldable material, compared to the material of the tube 10 and of the body member 12, is adapted to be disposed between the flange 30 and the shoulder 20. The ring 32 contains at least some rubber-like material so as to impart the elastic or spring-like properties of such material to said ring. The elastic ring 32 is disposed within a relatively rigid L-shaped backing ring 34 having a radially-inwardly-extending leg 36 disposed between the elastic ring 32 and the shoulder 20 and having a leg 38 extending axially away from the shoulder 20 about the outer periphery of the elastic ring 32. A second elastically yieldable ring 40, similar to the ring 32, is adapted to be disposed on the side of the flange 30 opposite to the ring 32. The ring 40 is also provided with a relatively rigid L-shaped backing ring 42. The L-shaped backing ring 42 has a radially-inwardly-extending leg 44 on the side of the yieldable ring 40 adjacent to the open end of the chamber 14 and said backing ring has a leg 46 disposed about the outer periphery of the elastic ring 40 and extending toward the shoulder 20. The axially extending legs 38 and 46 both have an external diameter fitted to the chamber portion 16 within which they are disposed, said legs abutting each other and being disposed radially outwardly of the flange 30.

A nut 48 is adapted to be threadedly secured to the body member 12. The nut 48 has an inturned flange 50 adapted to engage the leg 44 of the backing ring 42 for forcing the legs 38 and 46 of the backing rings into abutting engagement with the backing ring 34 engaging the shoulder 20. The relative dimensions of the backing rings 34 and 42, elastic rings 32 and 40 and the flange 30 are such that when the nut 48 is threaded on the body member 12 to force the backing rings to bottom against the shoulder 20, the elastic rings 32 and 40 are squeezed between their respective backing rings 38 and 42 and the flange 30 whereupon said elastic rings exert pressure in all directions, that is against both legs of their respective backing rings, against the tube 10 and against the flange 30. With this arrangement, the elastic rings 32 and 40 in effect comprise vibration damping springs operatively connecting the tube 10 to the body member 12 so as to yieldably restrain motion of said tube in all directions relative to said body member. Obviously other forms of springs may be substituted for the elastic rings 32 and 40. It should be noted that the minimum or inner diameter of the radially-inwardly-extending legs 36 and 44 of the backing rings is less than the outer diameter of the flange 30 whereby said legs and flange provide mechanical interference positively limiting motion of the tube 10 relative to the body member 12 when the backing rings are bottomed against the shoulder 20.

As stated, the nut 48 is tightened until the L-shaped backing rings abut each other and bottom against the shoulder 20. Accordingly when the nut 48 is thus tightened the magnitude of the stress within the elastic rings 32 and 40 is determined by the relative dimensions of the flange 30, the backing rings 38 and 42 and the elastic rings 32 and 40. For example any increase in the axial dimensions of the flange 30 and/or that of the elastic rings 32 and 40 would result in an increase in the stress in said elastic rings when the backing rings are bottomed against the shoulder 20 by the nut 48. This arrangement has the advantage in that it is not necessary to tighten the nut 48 to any predetermined torque in order that the elastic rings be squeezed with a predetermined desired pressure.

The elastic rings 32 and 40 contain sufficient rubber-like material so that said rings have the rubber or spring-like properties of such material and therefore may be termed rubber-like rings. If the rings 32 and 40 were composed entirely of rubber-like material, said material would tend to extrude out between the backing rings 38 and 42 and the tube 10. To prevent this, the rings 32 and 40 may comprise fibers of yarn bonded together by rubber-like material. For example it has been satisfactory to make the rings 32 and 40 of asbestos fibers bonded together by rubber-like material such that the rings contain as little as 15% of rubber-like material by weight.

A washer 52 is disposed between the packing ring 26 and the backing ring 34 to prevent extrusion of said packing ring between the tube 10 and said backing. The washer 52 should closely fit the tube 10 and the adjacent wall of the chamber portion 18 so that the rubber-like material of the packing ring 26 cannot extrude therebetween and the washer 52 should be relatively yieldable so as not to interfere with the elastic connection provided by the rings 32 and 40 between the tube 10 and the body member 12. Like the rings 32 and 40 it has been found satisfactory to make the washer 52 of asbestos fibers bonded together with rubber-like material. It has also been satisfactory to make the washer 52 of leather. The axial length of the chamber portion 18 between the washer 52 and the shoulder 24 is sufficient that the packing ring is not squeezed axially between said shoulder 24 and the ring 52 when the nut 48 is tightened to bottom the backing rings against the shoulder 20. Accordingly when the joint is assembled the axial width of the packing ring is less than the axial length of the annular space between the washer 52 and shoulder 24 within which said ring is disposed. With this arrangement, the packing ring 26 is not squeezed axially when the nut 48 is tightened. This is important since it is known that from the standpoint of seal effectiveness of the packing ring 26 said ring should not be squeezed axially and instead should merely be in radial compression.

The tube 10 is illustrated as having an outwardly flared inner end 54. The flared end 54 has been provided in order that the packing ring 26 remains on the tube 10 when said tube is withdrawn from the body member 12. Because of the flared end 54 of the tube 10 the washer 52 is split as indicated at 56 in Figure 5 in order to permit assembly of the washer 52 on the tube 10. Obviously the washer 52 need not be split if the tube 10 does not have the flared end 54. Also for reasons of assembly the inner diameter of the backing ring should be larger than the maximum diameter of the flared end 54 of the tube 10. To facilitate servicing of the joint, the backing ring 42 and its elastic ring 40 is made in two semi-circular halves (see Figure 3) disposed in end to end relation to make a complete ring. Also for this latter reason the minimum diameter of the nut flange 50 is larger than the maximum diameter of the tube flange 30. With these relative dimensions, the nut 48, backing rings 34 and 42, elastic rings 32 and 40, washer 52 and packing ring 26 may all be replaced without replacing the tube 10 with its flange 30.

The fluid tight joint of the present invention obviously is not limited to the precise structure illustrated in Figures 1 to 5. For example the nut 48 could be replaced by any other means connected to the member 12 for squeezing the elastic rings 32 and 40 against the tube flange 30. In addition, instead of tightening the nut 48 until the L-shaped backing rings 34 and 42 abut and bottom against the shoulder 20, said nut itself may first bottom against the member 12. Such an arrangement is illustrated in Figure 6. The construction of Figure 6 is generally similar to that of Figures 1 to 5 and the parts of Figure 6 corresponding to the parts of Figures 1 to 5 are designated by similar reference numerals with the subscript *a* added thereto.

In Figure 6 a fluid tight joint is provided between a tube 10a and a tubular body member 12a, said joint having characteristics generally similar to those of the joint illustrated in Figures 1 to 5. In Figure 6, the body member 12a is detachably secured, as by screws 60, to a supporting member 48a. As far as the fluid tight joint between the tube 10 and the body member 12a is concerned, the supporting member 48a of Figure 6 corresponds to the nut 48 of Figures 1 to 5 although said parts are structurally different. Thus the supporting member 48a has an inturned flange 50a engageable with the backing ring 42a for squeezing the elastic rings 32a and 40a against the tube flange 30a with the backing ring 34a engaging the end 20a of the body member 12a, said end 20a corresponding to the shoulder 20 of Figures 1 to 5.

In the arrangement of Figure 6, a seal is also provided between the supporting member 48a and the body member 12a by a seal ring 62 and therefore the members 12a and 48a are arranged to abut or bottom against each other before the backing ring legs 38a and 46a abut. Thus when the joint of Figure 6 is assembled, a small axial clearance is left between the backing rings 34a and 42a.

As in the arrangement of Figures 1 to 5, in Figure 6 the pressure exerted by the elastic rings 32 and 40a against the tube flange 30a does not depend on how tight the members 12a and 48a are clamped together, this pressure being predetermined by the dimensions of the parts. With the arrangement of Figures 1 to 5, however, this pressure is more radially predetermined since for given elastic rings 32 and 40 and tube flange 30, said pressure depends only on the overall axial dimension of the two backing rings 34 and 42 whereas in Figure 6 said pressure depends on dimensions of both the supporting member 48a and of the body member 12a.

In the fluid joints described, the tubes 10 and 10a are elastically restrained or damped against movement in both axial directions relative to their respective body members 12 and 12a as well as against relative radial movement. In certain installations however it may only be necessary to elastically restrain or damp axial vibrations of said tube in one axial direction relative to said body member in which case one of the elastic rings 32 or 40 of Figures 1–5 or 32a or 40a of Figure 6 and its associated L-shaped backing ring could be dispensed with.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications.

We claim:

1. A fluid tight joint comprising a tubular first member having an annular radially-outwardly-extending flange disposed adjacent to but axially spaced from one end of said member; a second member having an open-ended chamber within which said one end of said first member extends in clearance relation; a packing ring of rubber-like material co-axially disposed in radial compression within said chamber in an annular space about said first member, said packing ring having a free external diameter greater than that portion of the radially outer wall of said space engaged by said packing ring and having a free internal diameter smaller than that portion of the radially inner wall of said space engaged by said packing ring; first and second ring means of L-shaped cross-section disposed in clearance relation with said first member, each of said ring means having a radially-inwardly-extending leg and an axially extending leg with the radially-inwardly extending legs of said ring means being disposed on opposite axially-spaced sides of and having a minimum diameter less than the maximum diameter of said flange and with said axially extending legs of said ring means being directed toward each other and disposed radially outwardly of said flange; first and second annular rubber-like means disposed between the legs of said first and second ring means respectively; and means connected to said second member for axially squeezing said first and second annular rubber-like means between their respective L-shaped ring means and said flange thereby yieldably restraining movement of said first member relative to said second member.

2. A fluid tight joint as recited in claim 1 and including a washer of yieldable material co-axially fitted between said first member and the adjacent wall of said chamber and disposed between said rubber-like packing ring and said L-shaped ring means.

3. A fluid tight joint comprising a tubular first member having an annular radially-outwardly-extending flange disposed adjacent to but axially spaced from one end of said member; a second member having an open-ended chamber with said chamber having a relatively large diameter first portion adjacent to its open end and a relatively small diameter second portion disposed inwardly of said first portion to form an annular shoulder between said chamber portions facing said open end, said one end of said first member extending into said chamber at least part way into said second chamber portion with said flange disposed in said first chamber portion; a packing ring of rubber-like material disposed within said second chamber portion in an annular space about said first member, said packing ring being radially compressed in said annular space and having a free external diameter greater than that portion of the radially outer wall of said space engaged by said packing ring and having a free internal diameter smaller than that portion of the radially inner wall of said space engaged by said packing ring; first and second ring means of L-shaped cross-section disposed in clearance relation with said first member, each of said ring means having a radially-inwardly-extending leg and an axially extending leg with the radially-extending legs of said ring means being disposed on opposite axially-spaced sides of and having a minimum diameter less than the maximum diameter of said flange and with the axially-extending legs of said ring means being fitted within said first chamber portion radially outwardly of said flange and abutting each other; first and second annular rubber-like means disposed between the legs of said first and second ring means respectively; and means connected to said second member for axially clamping said first and second ring means together and against said shoulder to squeeze said first and second annular rubber-like means between their respective L-shaped ring means and said flange thereby yieldably restraining movement of said first member relative to said second member.

References Cited in the file of this patent

UNITED STATES PATENTS

| | | |
|---|---|---|
| 1,955,832 | Raybould | Apr. 24, 1934 |
| 2,354,358 | Parker | July 25, 1944 |
| 2,425,662 | Wolfram | Aug. 12, 1947 |
| 2,453,391 | Whittingham | Nov. 9, 1948 |
| 2,460,032 | Risley | Jan. 25, 1949 |
| 2,469,851 | Stecher | May 10, 1949 |
| 2,475,026 | Hynes | July 5, 1949 |
| 2,562,359 | Iredell | July 31, 1951 |
| 2,580,626 | Warren | Jan. 1, 1952 |

FOREIGN PATENTS

| | | |
|---|---|---|
| 115,081 | Great Britain | July 17, 1917 |